(12) United States Patent
Ulbrich et al.

(10) Patent No.: US 6,880,368 B1
(45) Date of Patent: Apr. 19, 2005

(54) LOCKING SYSTEM FOR GOOSENECK TRAILER HITCH

(75) Inventors: Dennis R. Ulbrich, 1706 Avenue J, Hondo, TX (US) 78861; Derrick A. Pizarro, San Antonio, TX (US)

(73) Assignee: Dennis R. Ulbrich, Hondo, TX (US)

( * ) Notice: Subject to any disclaimer, the term of this patent is extended or adjusted under 35 U.S.C. 154(b) by 0 days.

(21) Appl. No.: 09/902,440

(22) Filed: Jul. 10, 2001

Related U.S. Application Data

(60) Provisional application No. 60/217,055, filed on Jul. 10, 2000.

(51) Int. Cl.[7] .............................. E05C 73/00; B60D 1/06
(52) U.S. Cl. .............................. 70/14; 70/57; 70/258; 280/507; 280/511; 280/512; 280/425.2
(58) Field of Search ............................ 70/57, 58, 231, 70/258, 14; 280/507, 511, 425.2, 512

(56) References Cited

U.S. PATENT DOCUMENTS

| | | | | | |
|---|---|---|---|---|---|
| 2,204,882 | A | * | 6/1940 | Berluti ...................... 280/511 |
| 3,125,355 | A | * | 3/1964 | Snuggins .................... 280/457 |
| 3,237,969 | A | * | 3/1966 | Geresy ....................... 280/507 |
| 3,374,268 | A | * | 3/1968 | Groves ....................... 280/512 |
| 3,780,546 | A | * | 12/1973 | Longenecker .................. 70/58 |
| RE28,187 | E | * | 10/1974 | Longenecker .................. 70/58 |
| 3,933,384 | A | * | 1/1976 | Schuller et al. ............. 292/285 |
| 4,077,650 | A | * | 3/1978 | Leach, Jr. ................. 280/423.1 |
| 4,141,233 | A | * | 2/1979 | Reyes ........................ 70/232 |
| 4,176,853 | A | * | 12/1979 | Brock ..................... 280/423.1 |
| 4,283,073 | A | * | 8/1981 | Gostomski et al. .......... 280/508 |
| 4,286,814 | A | * | 9/1981 | Harrington et al. ......... 292/281 |
| 4,320,907 | A | * | 3/1982 | Eaton ....................... 280/511 |
| 4,380,160 | A | * | 4/1983 | Hoffman ....................... 70/14 |
| 4,548,418 | A | * | 10/1985 | Wendorff ...................... 280/1 |
| 4,558,880 | A | * | 12/1985 | Nangle et al. ............. 280/457 |
| 4,620,718 | A | * | 11/1986 | Mickelson ................. 280/507 |
| 4,691,935 | A | * | 9/1987 | Brandt ..................... 280/507 |
| 4,693,096 | A | * | 9/1987 | Mercer ........................ 70/14 |
| 4,699,395 | A | * | 10/1987 | Hale ....................... 280/511 |
| 4,776,607 | A | * | 10/1988 | Richter et al. ............. 280/507 |
| 4,896,518 | A | * | 1/1990 | Appelgren ..................... 70/54 |
| 5,052,203 | A | * | 10/1991 | Van Cuyk .................... 70/232 |
| 5,181,405 | A |   | 1/1993 | Wheeler ...................... 70/232 |
| 5,222,755 | A | * | 6/1993 | O'Neal ..................... 280/507 |
| 5,255,545 | A |   | 10/1993 | Wheeler ...................... 70/232 |
| 5,263,735 | A | * | 11/1993 | Mann ....................... 280/512 |
| 5,322,316 | A | * | 6/1994 | Wheeler .................... 280/507 |
| 5,382,109 | A |   | 1/1995 | Nyman ...................... 403/316 |
| 5,410,893 | A | * | 5/1995 | Easterwood .................... 70/14 |
| 5,482,309 | A | * | 1/1996 | Hollis ..................... 280/423.1 |
| 5,513,871 | A |   | 5/1996 | Johnson .................... 280/507 |
| 5,520,030 | A |   | 5/1996 | Muldoon ....................... 70/14 |
| 5,582,420 | A |   | 12/1996 | Ulbrich .................... 280/507 |
| 5,700,024 | A | * | 12/1997 | Upchurch ................... 280/507 |
| 5,743,116 | A | * | 4/1998 | Suster ......................... 70/14 |
| 5,788,258 | A | * | 8/1998 | Gill et al. ............... 280/491.1 |
| 5,918,488 | A | * | 7/1999 | Deeter ........................ 70/14 |
| 5,961,140 | A | * | 10/1999 | Huskey ..................... 280/507 |
| 6,109,078 | A |   | 8/2000 | Marshall ..................... 70/232 |
| 6,199,891 | B1 | * | 3/2001 | Bell et al. ................ 280/507 |
| 6,234,509 | B1 | * | 5/2001 | Lara ....................... 280/425.2 |
| 6,412,313 | B1 | * | 7/2002 | Bernstrom ..................... 70/14 |

OTHER PUBLICATIONS

Redneck Trailer Supplies; www.redneck–trailer.com/products.htm; printout of products catalog, Section F–7.

* cited by examiner

*Primary Examiner*—Daniel P. Stodola
*Assistant Examiner*—Carlos Lugo
(74) *Attorney, Agent, or Firm*—Cox Smith Matthews Incorporated

(57) ABSTRACT

A method and an apparatus for locking a gooseneck trailer hitch such that a hitch ball cannot be inserted into or removed from the hitch. In one preferred embodiment, the hasp of a lock is passed through the retainer bracket of the hitch and locked with or without passing through the hitch handle. In another embodiment, a lock pin with an eyelet on one end is inserted into the retainer bracket of the hitch, and the hasp of a lock is passed through the eyelet and the hitch handle. In yet another embodiment, a lock pin with an eyelet on one end is inserted into a pair of openings on the cover plate surrounding the hitch handle, and the hasp of a lock is passed through the eyelet and the hitch handle.

6 Claims, 17 Drawing Sheets

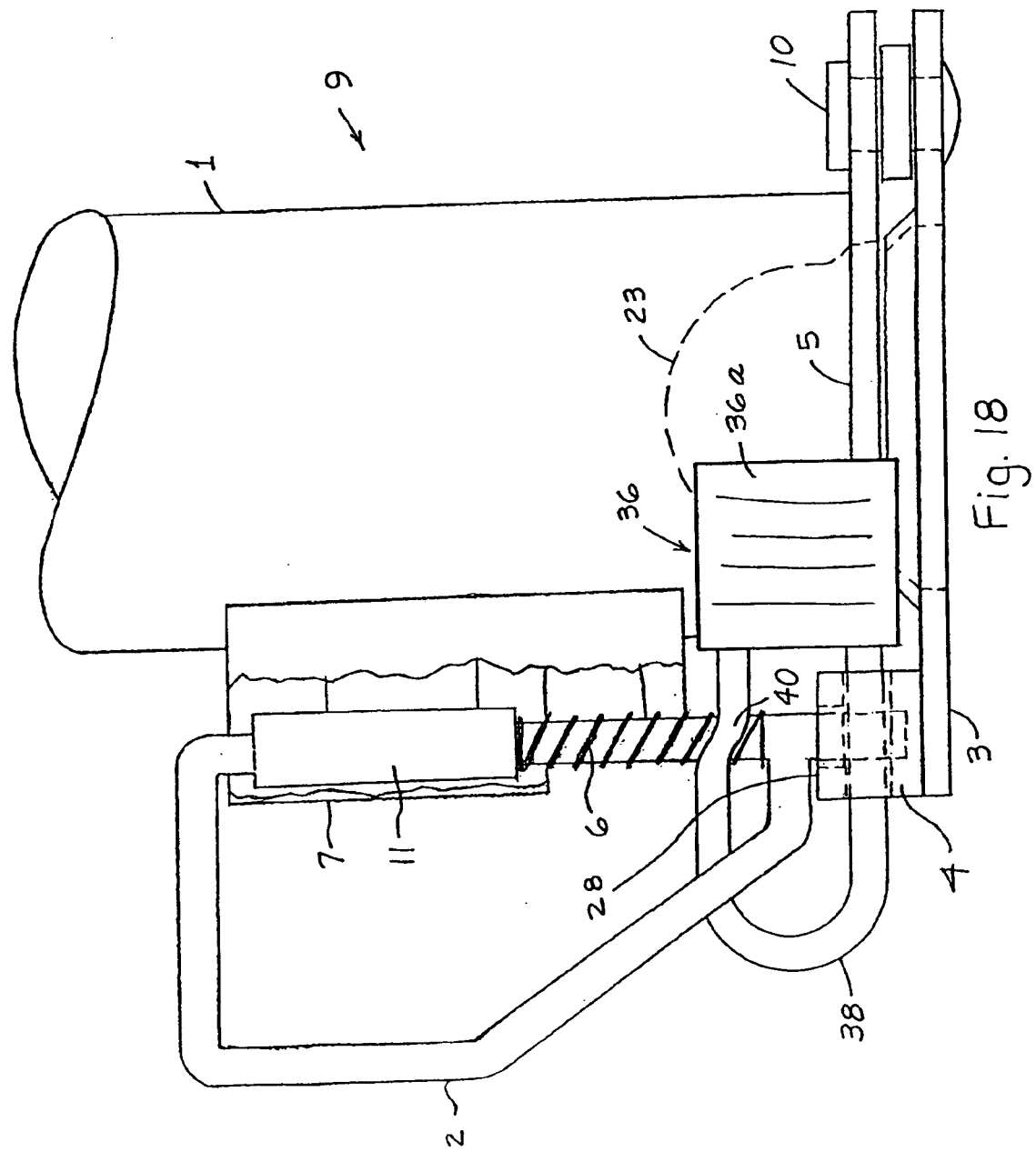

LOCKING SYSTEM FOR GOOSENECK TRAILER HITCH

CROSS REFERENCE TO RELATED APPLICATION

This application claims priority from U.S. Provisional Application Ser. No. 60/217,055 filed Jul. 10, 2000.

BACKGROUND OF THE INVENTION

1. Field of the Invention

This invention relates generally to a method and apparatus for locking a gooseneck trailer hitch to prevent unauthorized hitching or unhitching of a gooseneck trailer.

2. Description of the Related Art

Although gooseneck trailers have been used for a number of years to haul various types of cargo, a need exists for an acceptable locking mechanism to lock the hitch of a gooseneck trailer to prevent unauthorized hitching or unhitching of the trailer. Few locking devices are known in the art, and the known locking devices are undesirable because they are too cumbersome, complicated, or vulnerable to vandalism. For example, one existing gooseneck trailer hitch locking device comprises a heavy steel box-like structure that fits around the end of the hitch. The top and one end of the box-like structure are open to receive the hitch, and a rod spans the gap between the side walls at the open end to guard against removal of the device after it is installed. The rod is fastened in place with a lock that protrudes from a side wall of the box-like structure. Such device is heavy and cumbersome to install. Additionally, the protruding lock may be sawed off with relative ease or sheared off with a heavy hammer. Those deficiencies severely limit the usefulness of such a device.

Because the existing gooseneck trailer hitch locking devices are so undesirable, many gooseneck trailer owners simply do not lock their trailer hitches. The absence of a lock on a gooseneck trailer hitch presents substantial safety and security problems. During towing operations, a gooseneck trailer hitch may experience large static and dynamic structural loads. Without an effective lock, the trailer hitch may be jolted loose from the hitch ball, which would send the trailer careening down the roadway out of control. Such a runaway trailer could cause severe damage to people and property, including the trailer itself. Additionally, because modern gooseneck trailers may be worth thousands of dollars, the lack of a locking mechanism presents a significant risk of theft for a stationary trailer, particularly for an unhitched trailer. As discussed below, a standard gooseneck trailer hitch provides no means for locking the hitch, either in the hitched or unhitched condition.

FIG. 1 illustrates a top front perspective view of a standard gooseneck coupler 9, such as a Hammerblow™ coupler (U.S. Pat. No. 5,382,109) or equivalent, in a closed position. Coupler 9 comprises a tubular sheathing member 1, which is mountable on a trailer (not shown) by means of a conventional fastening method, such as welding. A stationary plate 5 is fixedly attached to the base of sheathing member 1, and a lock plate 3 is pivotally attached to stationary plate 5, as described below in connection with FIG. 2. Lock plate 3 swings open to allow stationary plate 5 to receive a standard hitch ball 19 into a hitch ball receiving cavity 23 (shown in FIG. 2), the structure and operation of which are well known in the art. Hitch ball 19 is generally attached to a prime mover such as an automobile or truck (not shown). A retainer bracket 4 is fixedly attached to one end of lock plate 3 such that a first flange 26 of stationary plate 5 is disposed within the opening of retainer bracket 4. Retainer bracket 4 thus limits the pivotal range of lock plate 3. A first latch pin aperture 24 is located in the top web 28 of retainer bracket 4 to receive a latch pin 18 of a manually operable handle 2. A spring 6 provides a downward biasing force along the axis of latch pin 18 to resist upward motion of handle 2 away from the first latch pin aperture 24. Spring 6 thus biases handle 2 toward the closed position.

FIG. 2 illustrates a side elevational view of the standard coupler 9 of the prior art in a closed position. A first end of lock plate 3 is pivotally attached via pivot bolt 10 to a second flange 27 of stationary plate 5. A handle guide 11 slidably supports handle 2 such that latch pin 18 is both parallel to sheathing member 1 and mateably aligned with first latch pin aperture 24. A second latch pin aperture 25 is located in first flange 26 of stationary plate 5. Latch pin 18 passes through both the first latch pin aperture 24 and second latch pin aperture 25 to immobilize lock plate 3 in the closed position. A cover plate 7 enshrouds handle guide 11 and spring 6.

FIG. 3 illustrates a partially sectioned top view of the standard coupler 9 of the prior art in a closed position. Lock plate 3 has a hitch ball receiving aperture 30. As is evident, hitch ball receiving aperture 30 is offset relative to the hitch ball receiving cavity 23 of stationary plate 5 when lock plate 3 is in a closed position, which prevents hitch ball 19 (not shown) from being inserted into or removed from the hitch ball receiving cavity 23.

FIG. 4 illustrates a partially sectioned top view of the standard coupler 9 of the prior art in an open position. In this open position, hitch ball receiving aperture 30 is axially aligned with hitch ball receiving cavity 23 such that hitch ball 19 (not shown) may be inserted into or removed from hitch ball receiving cavity 23. Alignment of hitch ball receiving aperture 30 and hitch ball receiving cavity 23 is achieved by manually manipulating handle 2 to slidably remove latch pin 18 from first latch pin aperture 24 and manually pivoting lock plate 3 about the axis of pivot bolt 10.

FIG. 5 illustrates four distinct prior art embodiments of handle 2 (generally depicted) that may be utilized with coupler 9 (not shown). The function of each handle is essentially identical. The structure of each handle, however, may vary according to the preference of the operator. The first of these handle designs is a box chamfer handle 29, the second is a box round handle 20, the third is a box angle handle 21, and the fourth is a pistol grip handle 22. The present invention is not limited to use of any one of these four handle designs. Rather, these designs are illustrative of the various handle configurations that may be used with the present invention. For simplicity, box chamfer handle 29 is depicted in all other Figures and is referred to generically as "handle 2."

Referring generally to FIGS. 1 through 5, it will be apparent to persons reasonably skilled in the art that the prior art does not provide a suitable means for locking handle 2 in the closed position to prevent unauthorized hitching or unhitching of a gooseneck trailer. Because modern gooseneck trailers may be worth thousands of dollars, the lack of a locking mechanism presents a significant risk of theft. Additionally, due to the large forces that a gooseneck coupler may experience during towing operations, the coupler may become unhitched during travel if it is improperly installed, which presents a serious safety risk. It would, therefore, be a significant advancement in the art to provide a simple way to lock a conventional gooseneck coupler in the closed position to prevent unauthorized hitching or unhitching of a gooseneck trailer.

SUMMARY OF THE INVENTION

The present invention provides an improved coupler system for a gooseneck hitch which may be incorporated into the original manufacture of a coupler. Alternatively, a method is provided for the retrofitting of an existing standard coupler to achieve the improvements of the system.

In a first embodiment, a straight lock pin with an eyelet on one end is inserted into the sheathing member side of the retainer bracket. The eyelet is thus in close proximity to the coupler handle such that a conventional lock hasp may be passed through the eyelet and the coupler handle to secure the lock plate in the closed position thereby preventing the unauthorized insertion or removal of a hitch ball.

In a second embodiment, a lock pin opening is provided at a suitable location in the top web of the retainer bracket, and a lock pin is provided with an eyelet at one end and a bent shaft at the other end. The bent shaft of the lock pin is inserted into the lock pin opening of the retainer bracket while the lock plate is in the closed position. The eyelet of the lock pin is thus in close proximity to the coupler handle such that a lock hasp may be passed through the eyelet and the coupler handle to secure the lock plate in the closed position thereby preventing the unauthorized insertion or removal of a hitch ball.

In a third embodiment, the hasp of a specially designed lock is passed through the coupler handle and the retainer bracket to secure the lock plate in the closed position thereby preventing the unauthorized insertion or removal of a hitch ball.

In a fourth embodiment, two lock pin openings are provided in opposite sides of the cover plate of the coupler, and a straight lock pin with an eyelet on one end is inserted into the lock pin openings. With the lock plate and coupler handle in the closed position, the eyelet of the lock pin is placed in close proximity to the coupler handle such that a lock hasp may be passed through the eyelet of the lock pin and the coupler handle. The lock pin is long enough that it cannot be removed from the lock pin openings when the lock hasp is locked in place. Thus, the coupler handle and lock plate cannot be moved to the open position.

In a fifth embodiment, the hasp of a lock is passed through the retainer bracket and locked with the lock plate in the closed position but without passing through the coupler handle. The hasp of the lock is sized such that the lock plate is not free to swing to the open position because the hasp of the lock becomes bound between the stationary plate and the retainer bracket. Thus, even though the coupler handle may be released from engagement with the lock plate, the coupler may not be opened. The lock may be inserted from either side of the retainer bracket.

It is an object of the present invention to provide an improved yet simplified locking system for a gooseneck trailer hitch to prevent unauthorized hitching or unhitching of a gooseneck trailer.

It is another object of the present invention to provide a method and apparatus for locking a gooseneck trailer hitch to prevent theft of the trailer.

It is yet another object of the present invention to provide a method and apparatus for securing a gooseneck trailer to a prime mover in the hitched position such that the trailer will not come unhitched during towing operations.

It is still another object of the present invention to provide a simple method of retrofitting a conventional gooseneck trailer hitch to include a locking system.

Other objects and advantages of the present invention will be apparent to those skilled in the art from a reading of this specification.

BRIEF DESCRIPTION OF THE DRAWINGS

This invention may best be understood by reference to the following drawings:

FIG. 18 is a side elevational view of a gooseneck coupler and lock in accordance with yet another embodiment of the present invention.

DETAILED DESCRIPTION OF A PREFERRED EMBODIMENT

Figure 1:
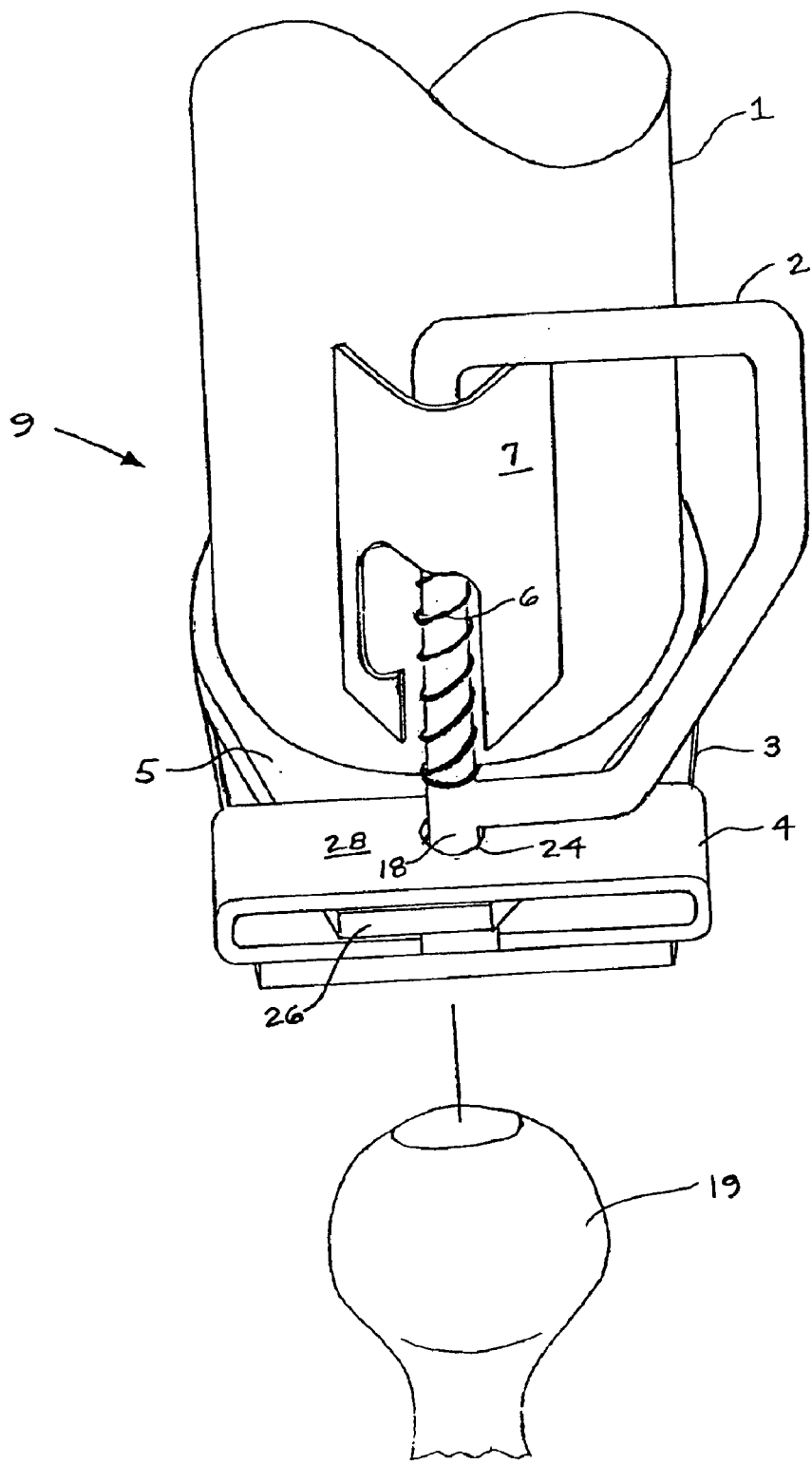
FIG. 1 is a perspective view of a standard prior art gooseneck coupler shown in a closed position.
Figure 2:
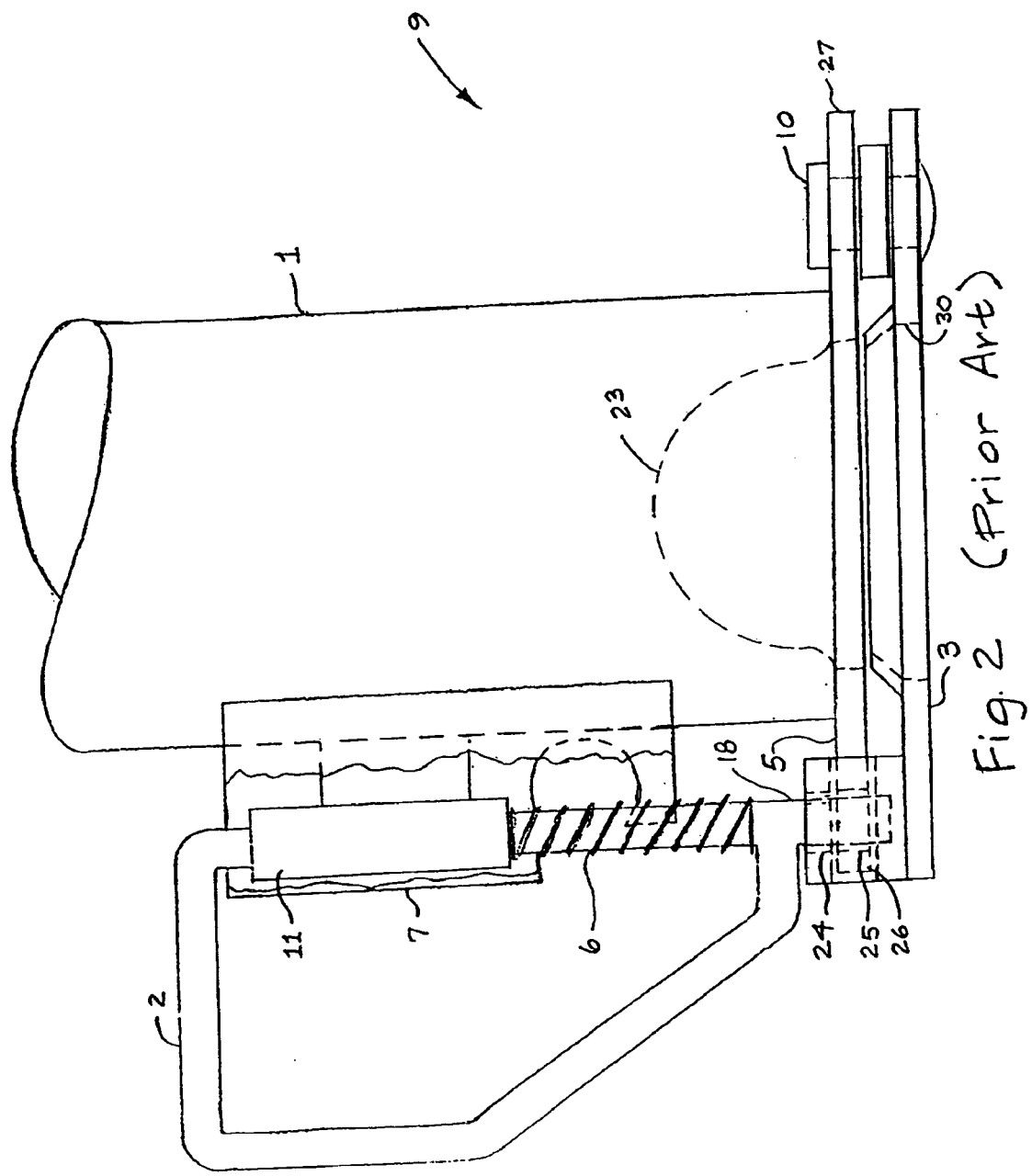
FIG. 2 is a side elevational view of the standard gooseneck coupler of FIG. 1.
Figure 3:
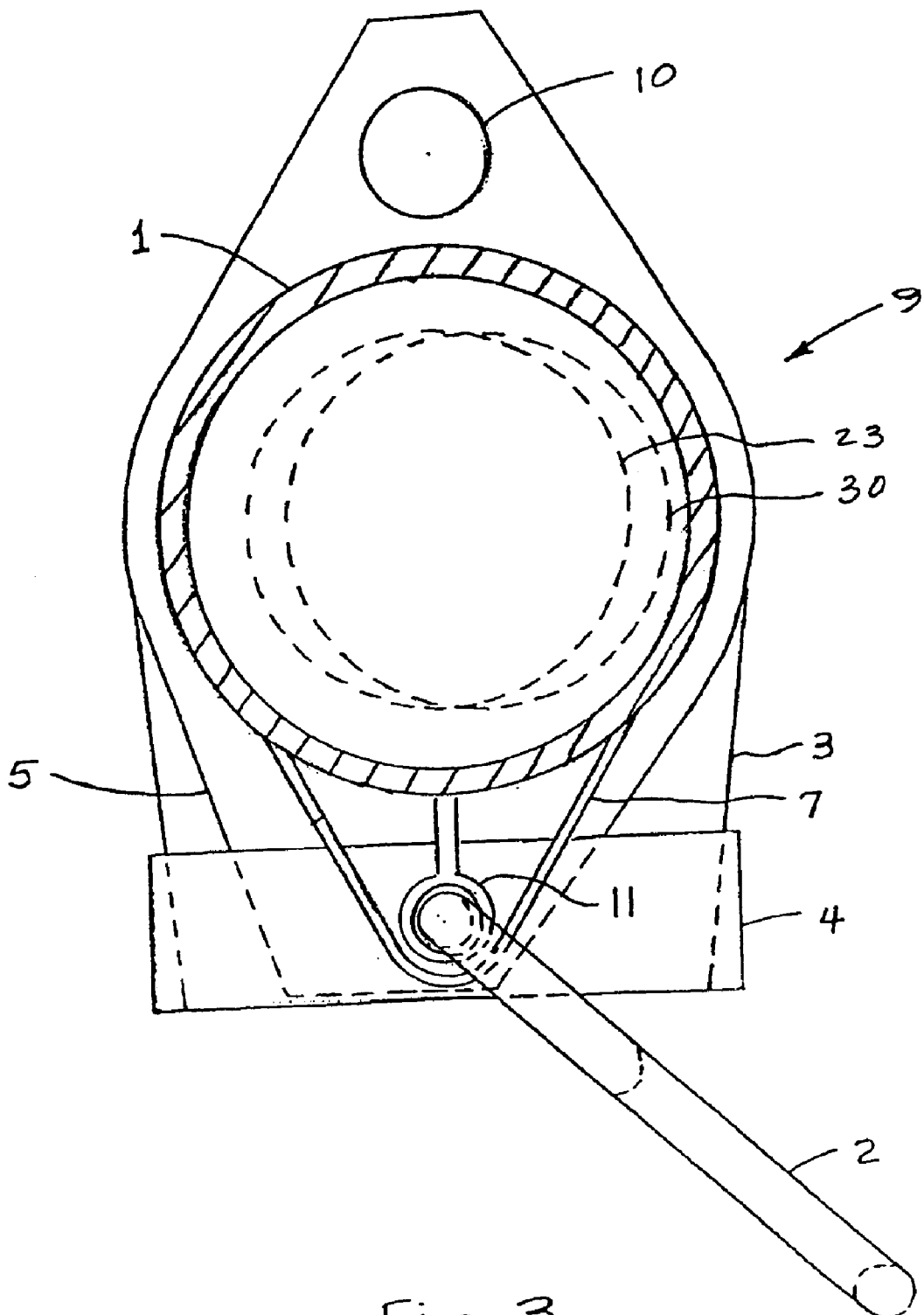
FIG. 3 is a top view of the standard gooseneck coupler of FIG. 1.
Figure 4:
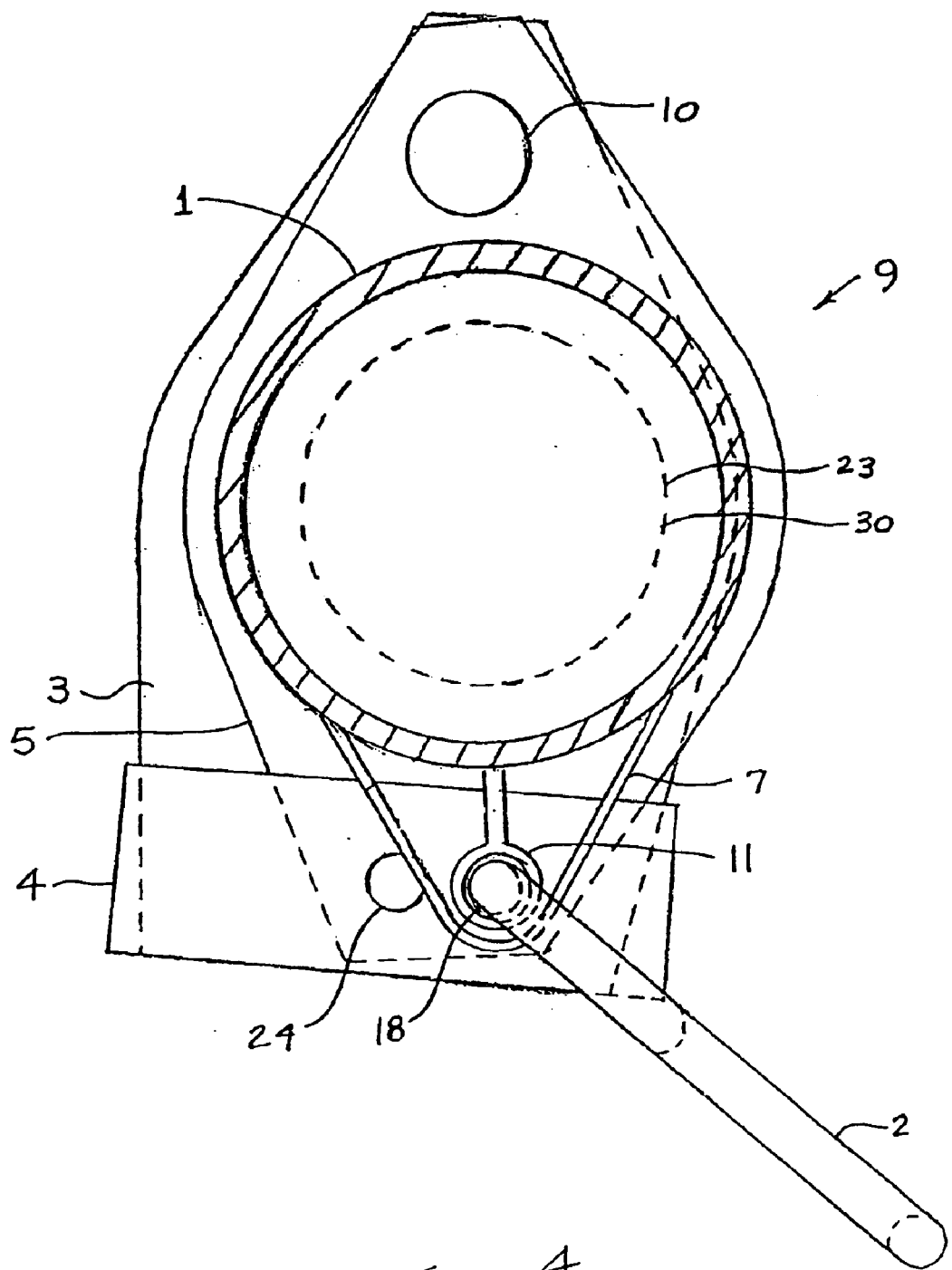
FIG. 4 is a top view of the standard gooseneck coupler of FIG. 1 shown in an open position.
Figure 6:
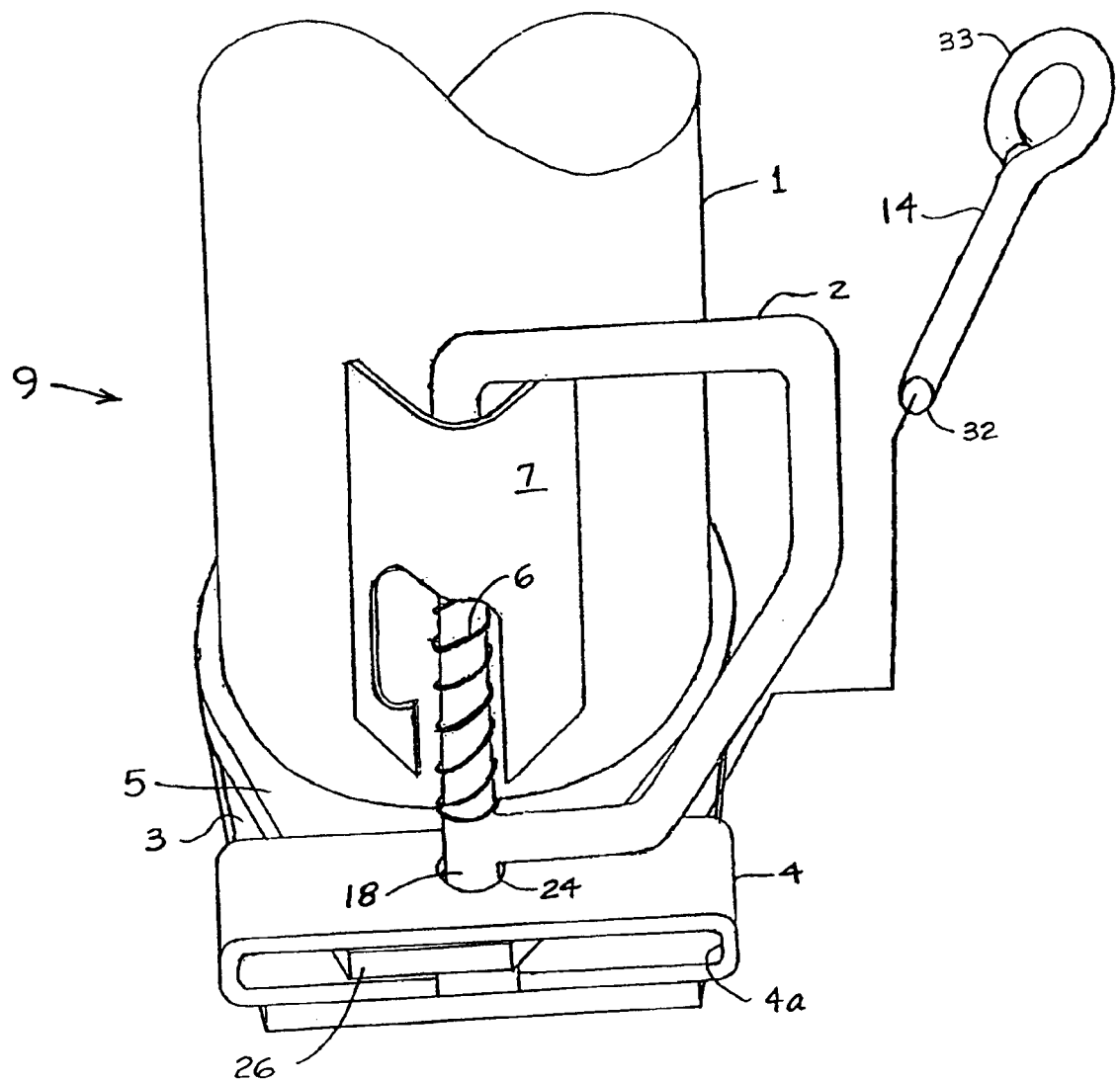
FIG. 6 is an exploded perspective view of a gooseneck coupler and a lock pin in accordance with the present invention.
Figure 7:
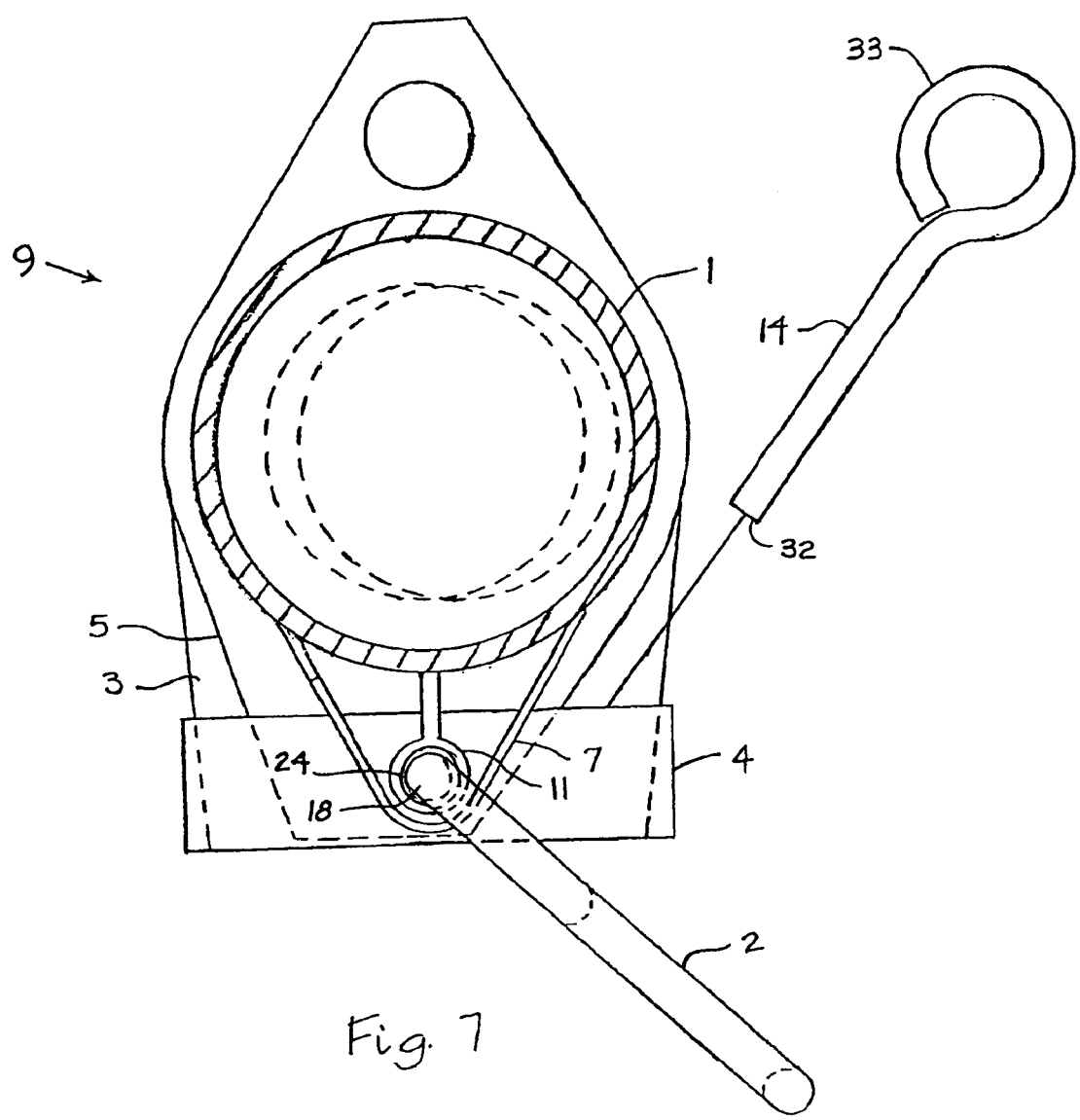
FIG. 7 is an exploded top view of the gooseneck coupler and lock pin of FIG. 6.
Figure 8:
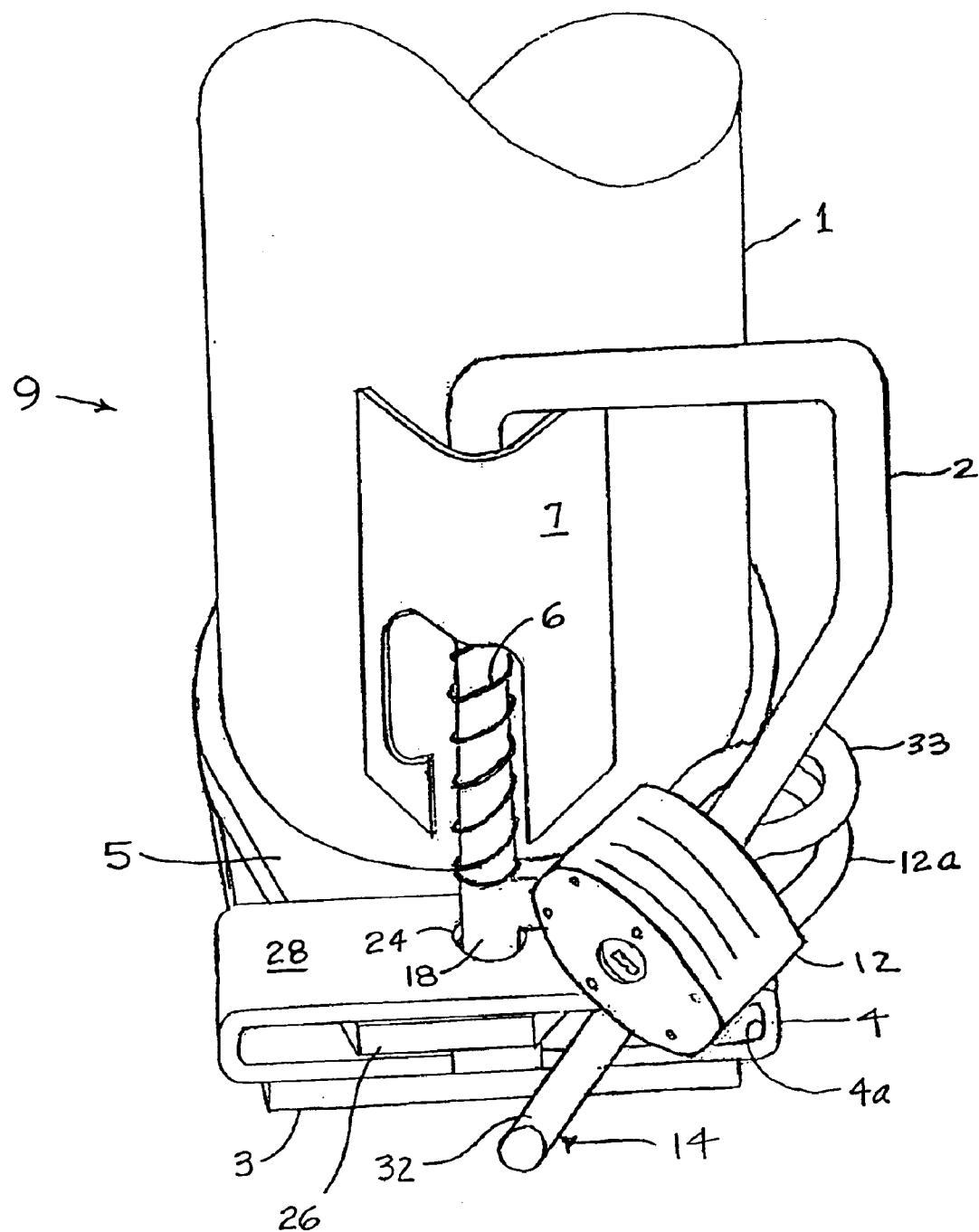
FIG. 8 is a perspective view of a gooseneck coupler, lock pin, and lock in accordance with the present invention.
Figure 9:
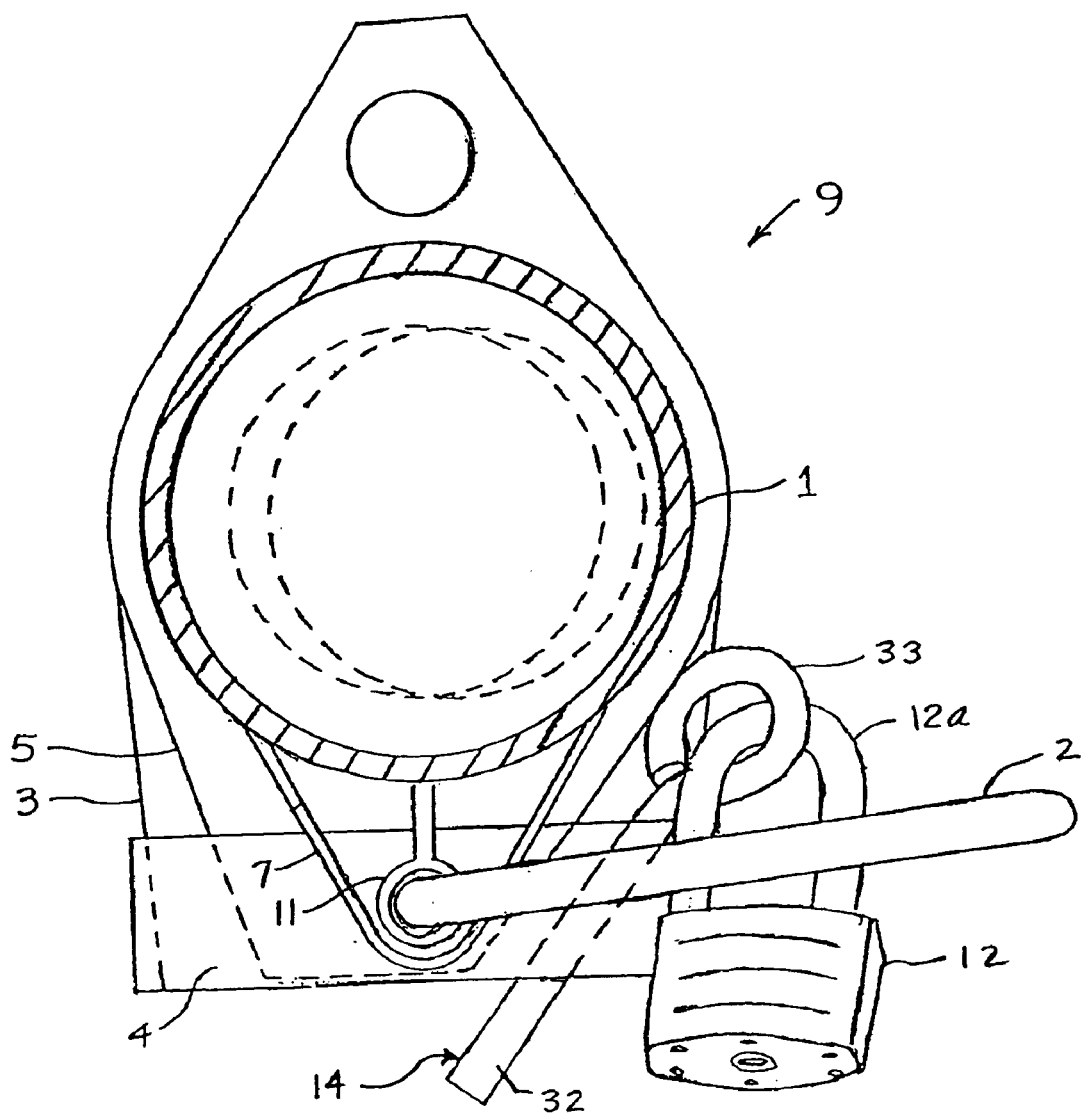
FIG. 9 is a top view of the gooseneck coupler, lock pin, and lock of FIG. 8.

FIGS. 6 and 7 illustrate the insertion of a lock pin 14 into a coupler 9 for a first preferred embodiment of the present invention. Lock plate 3 is in a closed position wherein latch pin 18 is inserted into first latch pin aperture 24 of retainer bracket 4 and second latch pin aperture 25 (shown in FIG. 2) of plate 5. A lock pin 14 having a straight shaft 32 on one end and an eyelet 33 on the other end is inserted into opening 4a of retainer bracket 4, preferably from the sheathing member side of retainer bracket 4, until eyelet 33 abuts retainer bracket 4. Lock pin 14 thus prevents movement of lock plate 3 to the open position depicted in FIG. 4. Preferably, if lock pin 14 is made from a standard eyebolt, the small gap at the intersection of eyelet 33 and shaft 32 may be welded closed such that lock pin 14 is one continuous structure. Alternatively, lock pin 14 may be cast as one continuous structure. As illustrated in FIGS. 8 and 9, after lock pin 14 is fully inserted into opening 4a of retainer bracket 4, the hasp 12a of a lock 12 is passed through eyelet 33 and handle 2 and is locked in the customary manner. The diameter of shaft 32, which is preferably about 7/16 in. for use with a standard coupler, should be selected so as to minimize loose play of shaft 32 in opening 4a. The length of shaft 32, which is preferably about 4 inches for use with a standard coupler, should be selected so as to prevent removal of lock pin 14 from retainer bracket 4 when lock 12 is secured to handle 2 and eyelet 33. In this manner, lock pin 14 and lock 12 cooperate with retainer bracket 4 to prevent handle 2 from being moved to the open position.

Figure 10:
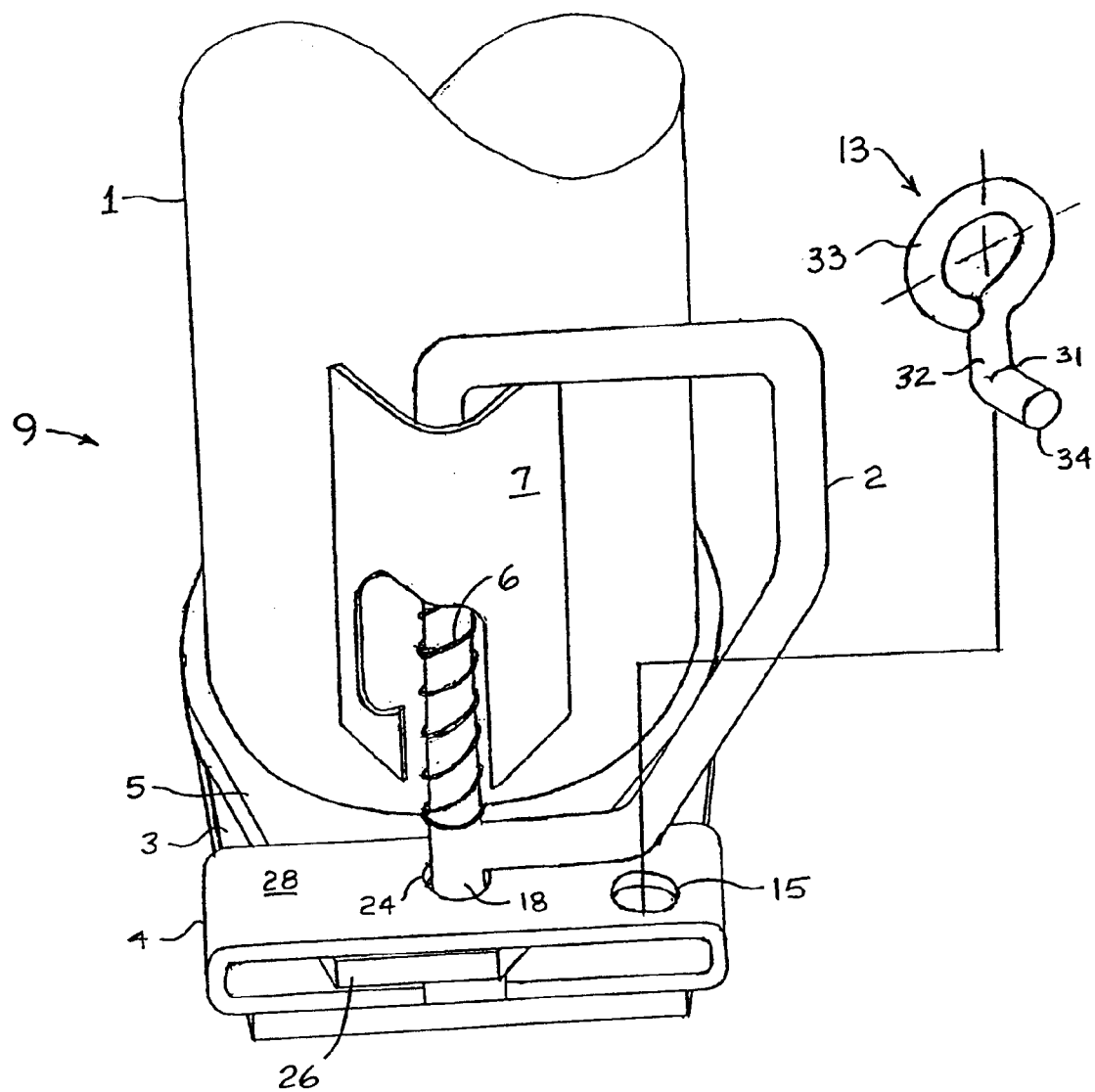
FIG. 10 is an exploded perspective view of a gooseneck coupler and an alternative lock pin in accordance with the present invention.
Figure 11:
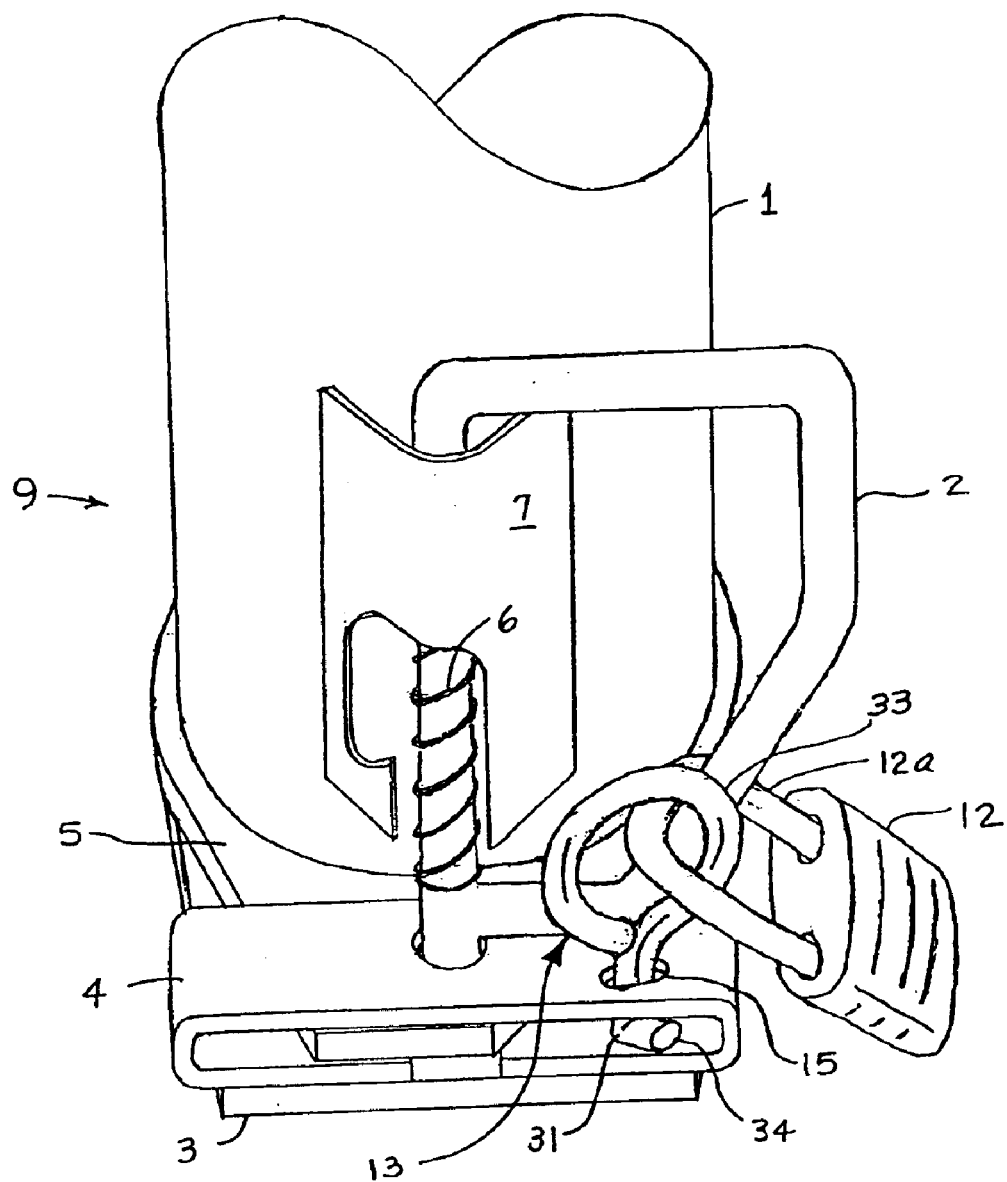
FIG. 11 is a perspective view of a gooseneck coupler, alternative lock pin, and lock in accordance with the present invention.
Figure 11A:
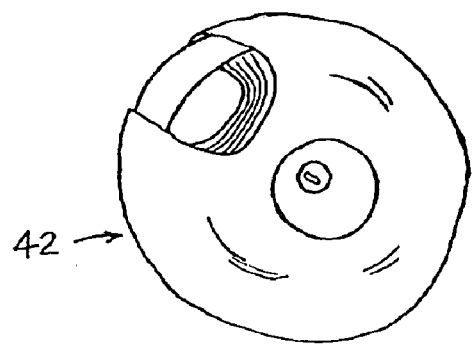
FIG. 11a is a perspective view of an alternative lock for use with the coupler and lock pin of FIG. 11.

FIG. 10 illustrates a second preferred embodiment of the present invention. Lock plate 3 and handle 2 are shown in a closed position wherein latch pin 18 is inserted into first latch pin aperture 24 and second latch pin aperture 25 (not shown). A lock pin opening 15, which is preferably of about 7/16 in. diameter, is created in top web 28 of retainer bracket 4 by any suitable means, such as drilling. A bent lock pin 13 is provided with an eyelet 33 at one end and a bend 31 in pin shaft 32 at the other end. Bend 31 is preferably a right-angle bend substantially perpendicular to the plane of eyelet 33 and located about 1¼ in. below the center of eyelet 33 for use with a standard coupler. However, depending on the particular geometry of a given coupler, bend 31 may be oriented at any other suitable angle with respect to eyelet 33. End 34 of pin shaft 32, which is preferably of about 3/8 in. diameter, preferably extends about 3/8 in. beyond bend 31 for use with a standard coupler. As shown in FIG. 11, end 34 of bent lock pin 13 is manipulatively inserted into lock pin opening 15 such that bend 31 is below the plane of lock pin opening 15. The hasp 12a of a lock 12 is passed through both the handle 2 and eyelet 33 of bent lock pin 13, and lock 12 is locked in the customary manner. Lock 12 preferably has a minimally-exposed hasp in order to make it difficult for a thief to cut through the hasp and remove lock 12. A particularly advantageous lock 42 for this embodiment is a round, maximum security Abus Diskus™ model 24/90, which is shown in FIG. 11a. This second preferred embodiment functions optimally with box round handle 20 of FIG. 5.

Figure 5:
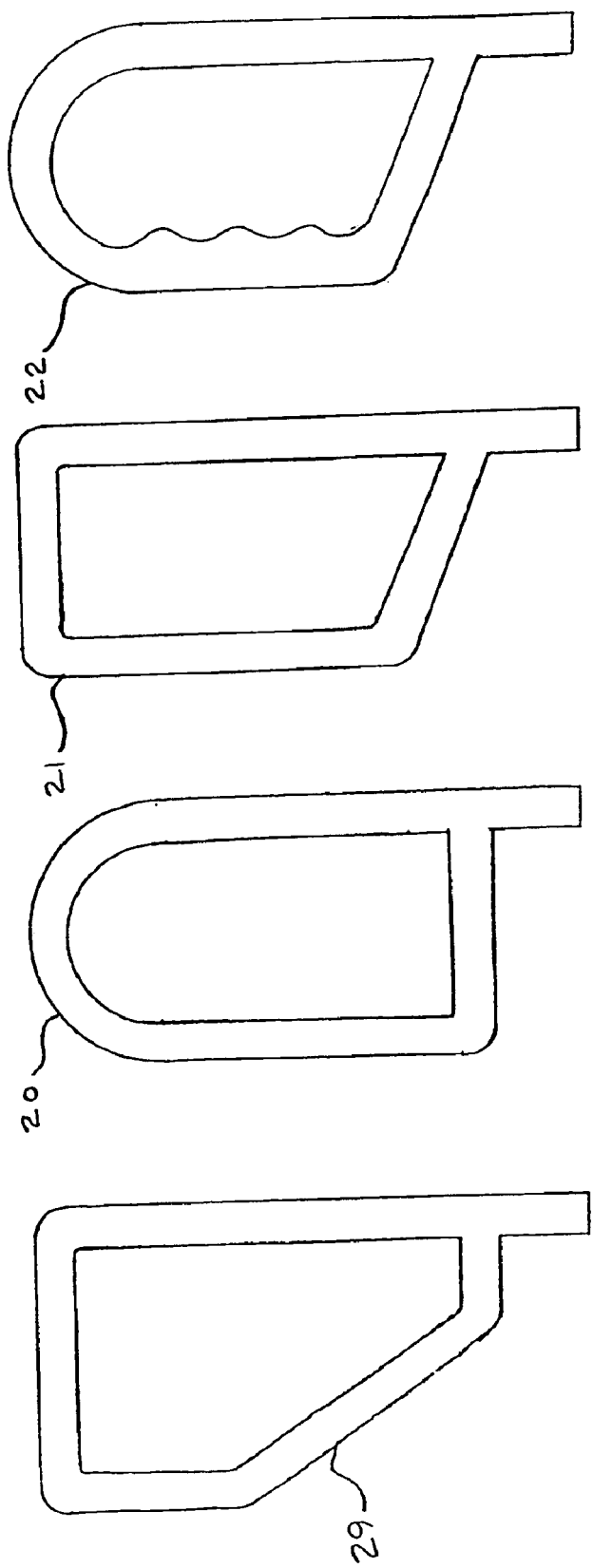
FIG. 5 is a side elevational view of four different handles known in the art.
Figure 14:
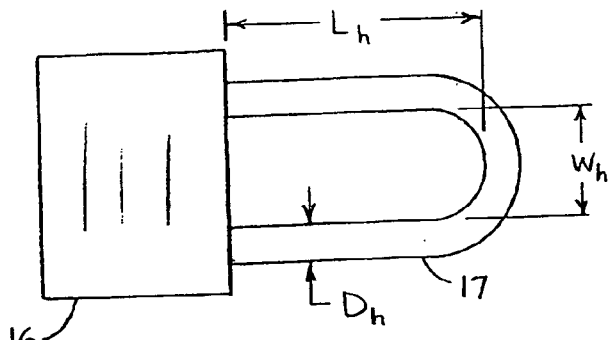
FIG. 14 is a side elevational view of the lock of FIG. 12.
Figure 12:
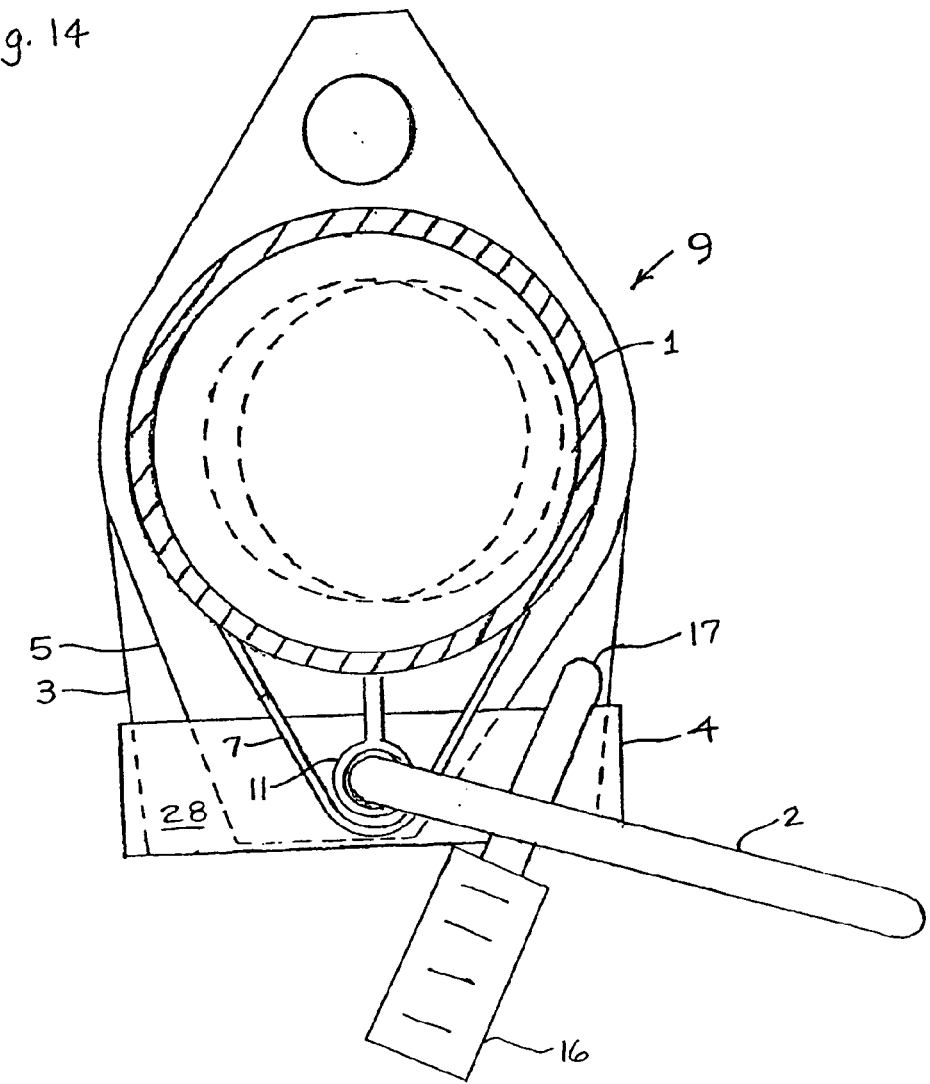
FIG. 12 is a top view of a gooseneck coupler and lock in accordance with another embodiment of the present invention.
Figure 13:
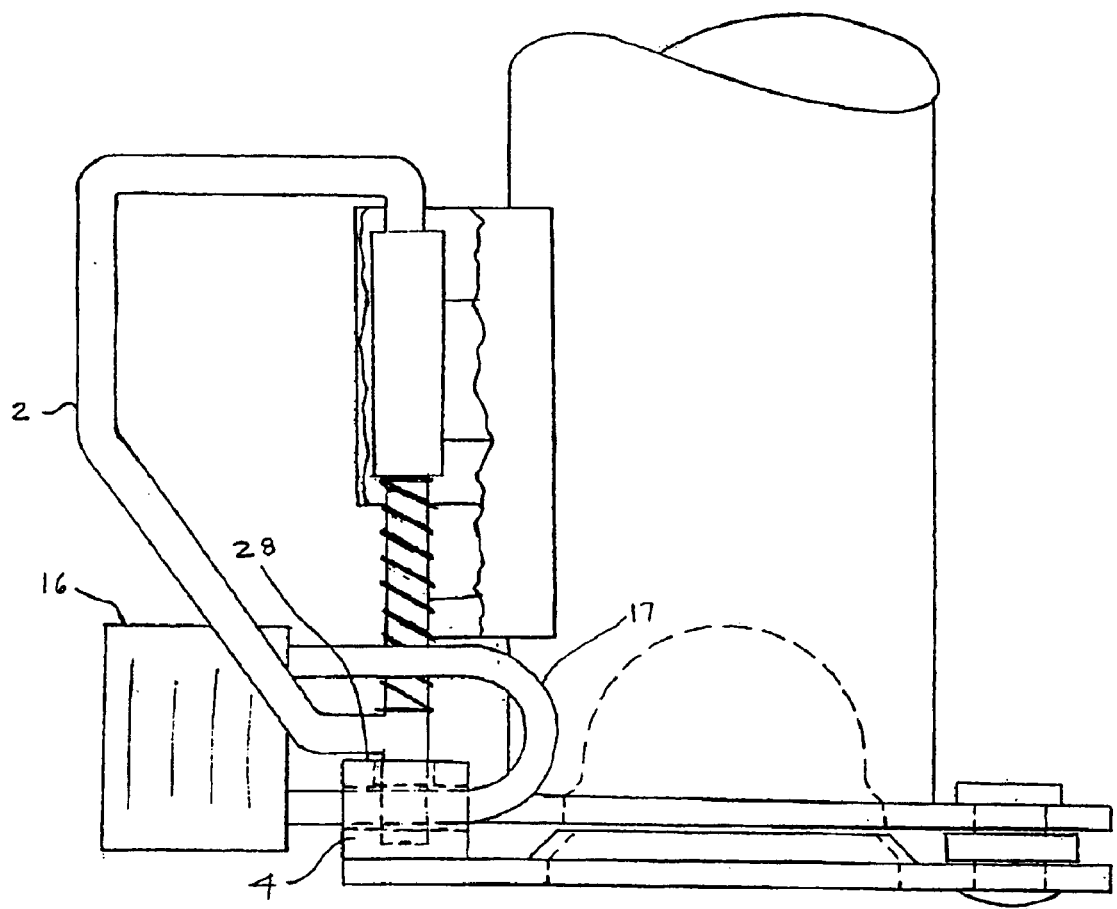
FIG. 13 is a side elevational view of the gooseneck coupler and lock of FIG. 12.
Figure 13A:
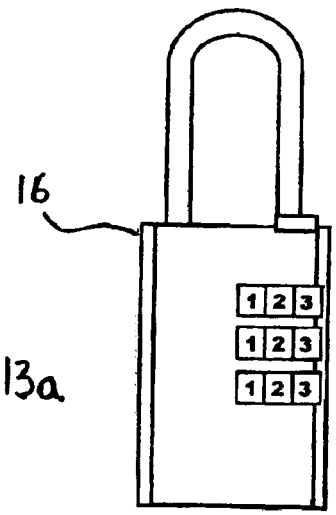
FIG. 13a is a perspective view of an alternative lock, a code-operated combination lock, for use with the coupler and lock of FIG. 12.

FIGS. 12, 13, and 14 illustrate a third preferred embodiment of the present invention wherein the hasp 17 of a lock 16 is passed through handle 2 and opening 4a of retainer bracket 4 and locked in the customary manner. Referring particularly to FIG. 14, the diameter $D_h$ of hasp 17 is preferably selected such that hasp 17 will pass through opening 4a of retainer bracket 4 with a small tolerance. The width $W_h$ between the legs of hasp 17 should be wide enough to permit hasp 17 to enclose the lower portion of handle 2 and the top web 28 of retainer bracket 4 with minimal clearance. The length $L_h$ of the legs of hasp 17 when in a locked position should be such that it is not possible to move handle 2 to the open coupler position. For example, with a standard gooseneck coupler having either a box chamfer handle 29 or a box round handle 20 as shown in FIG. 5, diameter $D_h$ is preferably about 7/16 in., width $W_h$ is preferably about 1.0 in., and length $L_h$ is preferably about 1¾ in. The body of lock 16 is preferably of a conventional design, such as a keyed or combination lock, and preferably should be constructed with a size, shape, and mass appropriate for the particular hasp, as desired. FIG. 13a illustrates one such conventional code-operated combination lock 16.

Figure 15:
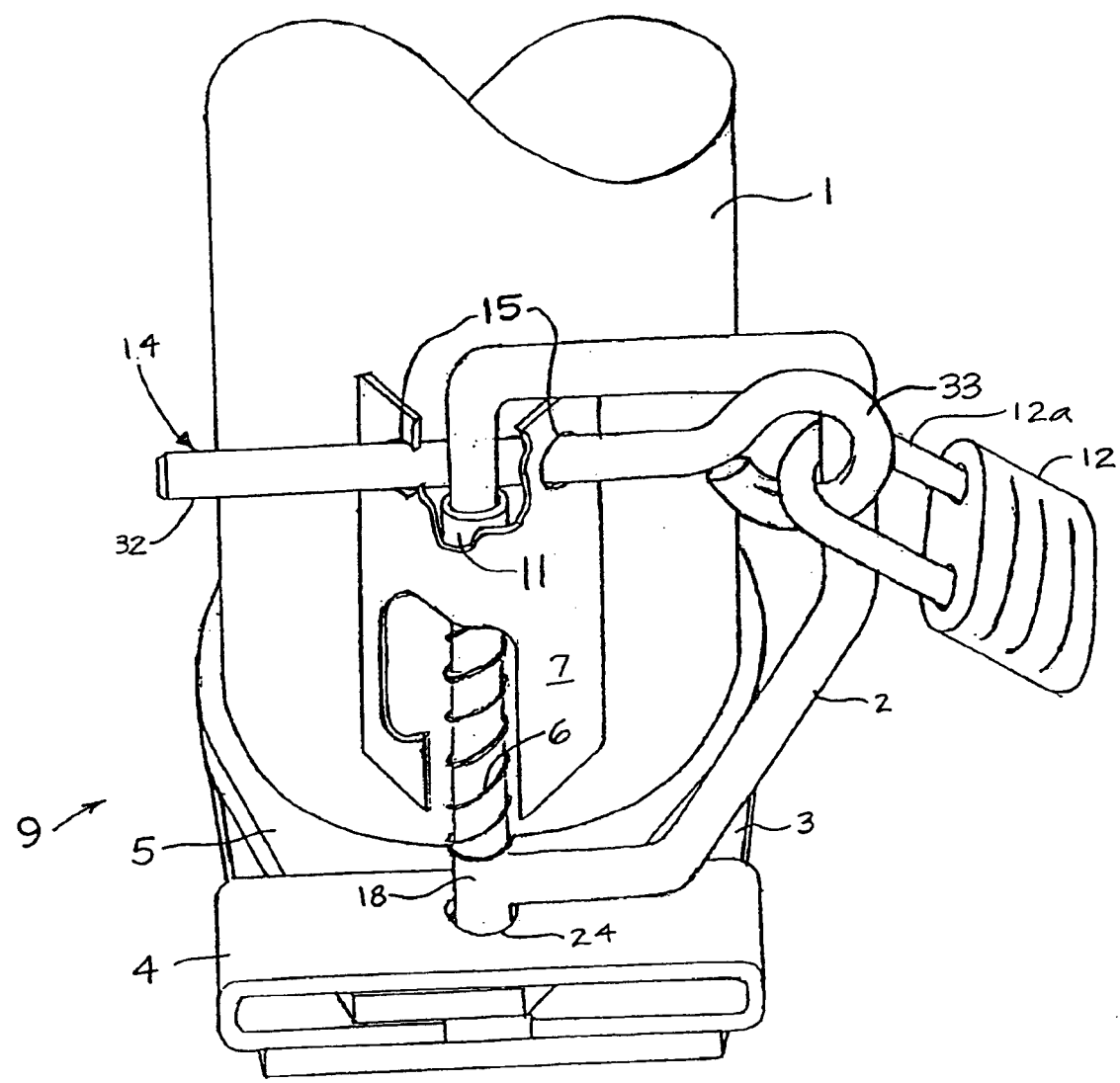
FIG. 15 is a perspective view of a gooseneck coupler, alternative lock pin, and lock in accordance with yet another embodiment of the present invention.
Figure 16:
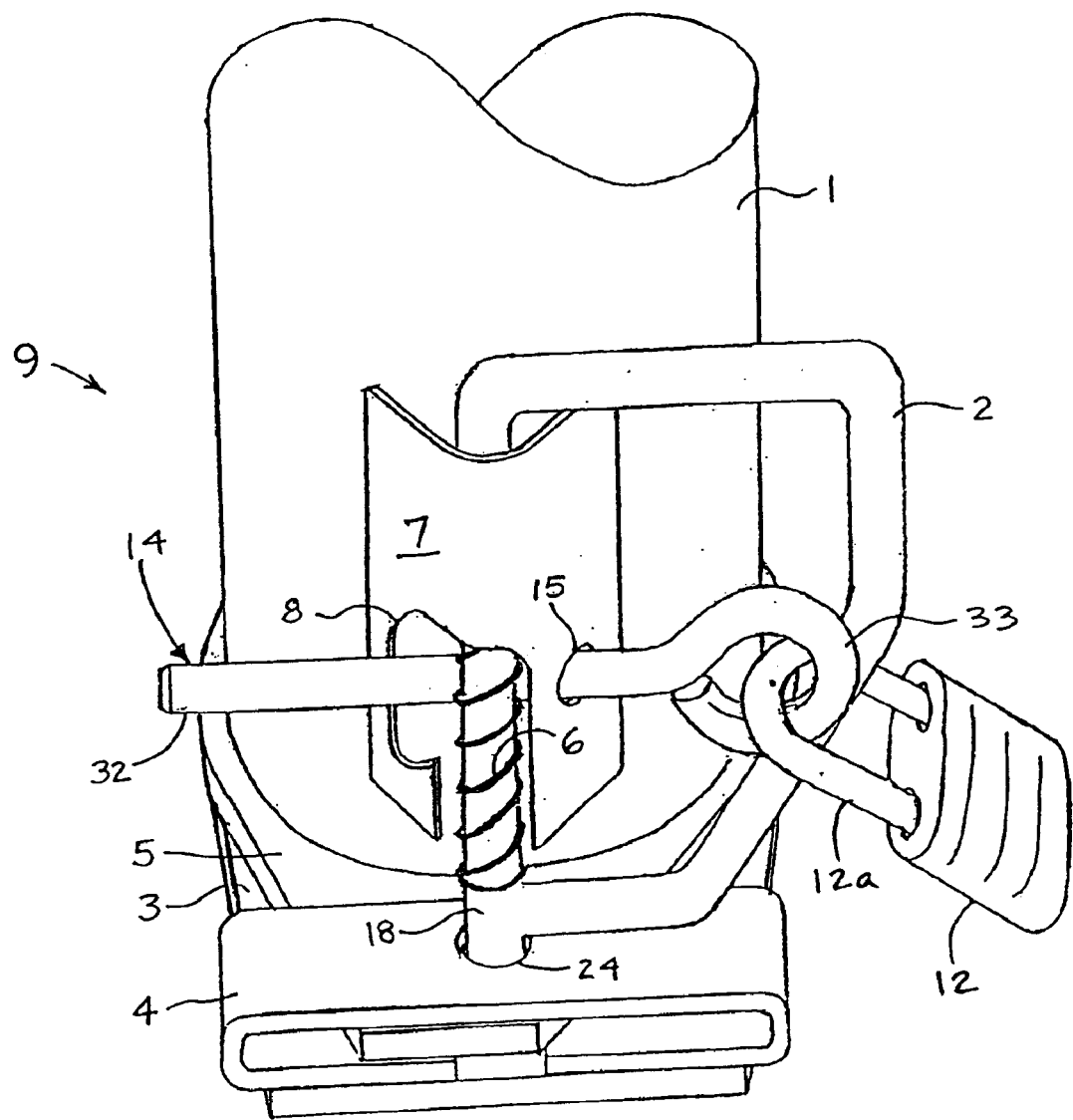
FIG. 16 is a perspective view of a gooseneck coupler, alternative lock pin, and lock in accordance with yet another embodiment of the present invention.

FIGS. 15 and 16 illustrate two methods of implementing a fourth preferred embodiment of the present invention. Lock plate 3 and handle 2 are shown in a closed position wherein latch pin 18 is inserted into first latch pin aperture 24 and second latch pin aperture 25 (not shown). A lock pin 14 is provided with a straight shaft 32 on one end and an eyelet 33 on the other end. The length of lock pin 14 is preferably about 6 inches long, or at least long enough that lock pin 14 will secure the handles of FIG. 5 without sliding out of the lock pin openings 15. The diameter of shaft 32 is preferably about 7/16 in.

FIG. 15 illustrates a first method of implementing the fourth preferred embodiment, wherein two lock pin openings 15 are created on opposite sides of cover plate 7 at such locations to allow lock pin 14 to pass through each lock pin opening 15 such that lock pin 14 is disposed between latch pin 18 and sheathing member 1 and above handle guide 11. The lock pin openings 15, which are preferably of about 7/16 in. diameter, may be created by any suitable means, such as drilling. Shaft 32 of lock pin 14 is inserted through both lock pin openings 15 until eyelet 33 is adjacent handle 2 such that hasp 12a of lock 12 may be passed through both eyelet 33 and handle 2. Lock 12 is then locked in the customary manner.

FIG. 16 illustrates a second method of implementing the fourth preferred embodiment, wherein a lock pin opening 15 is created in cover plate 7 preferably at about the same vertical location as the midpoint of cutout 8 and at a lateral location that will allow lock pin 14 to pass through lock pin opening 15, between latch pin 18 and sheathing member 1, and through cutout 8. Shaft 32 of lock pin 14 is inserted through lock pin opening 15 and cutout 8 until eyelet 33 is adjacent handle 2 such that hasp 12a of lock 12 may be passed through both eyelet 33 and handle 2. Again, lock 12 is then locked in the customary manner.

Figure 17:
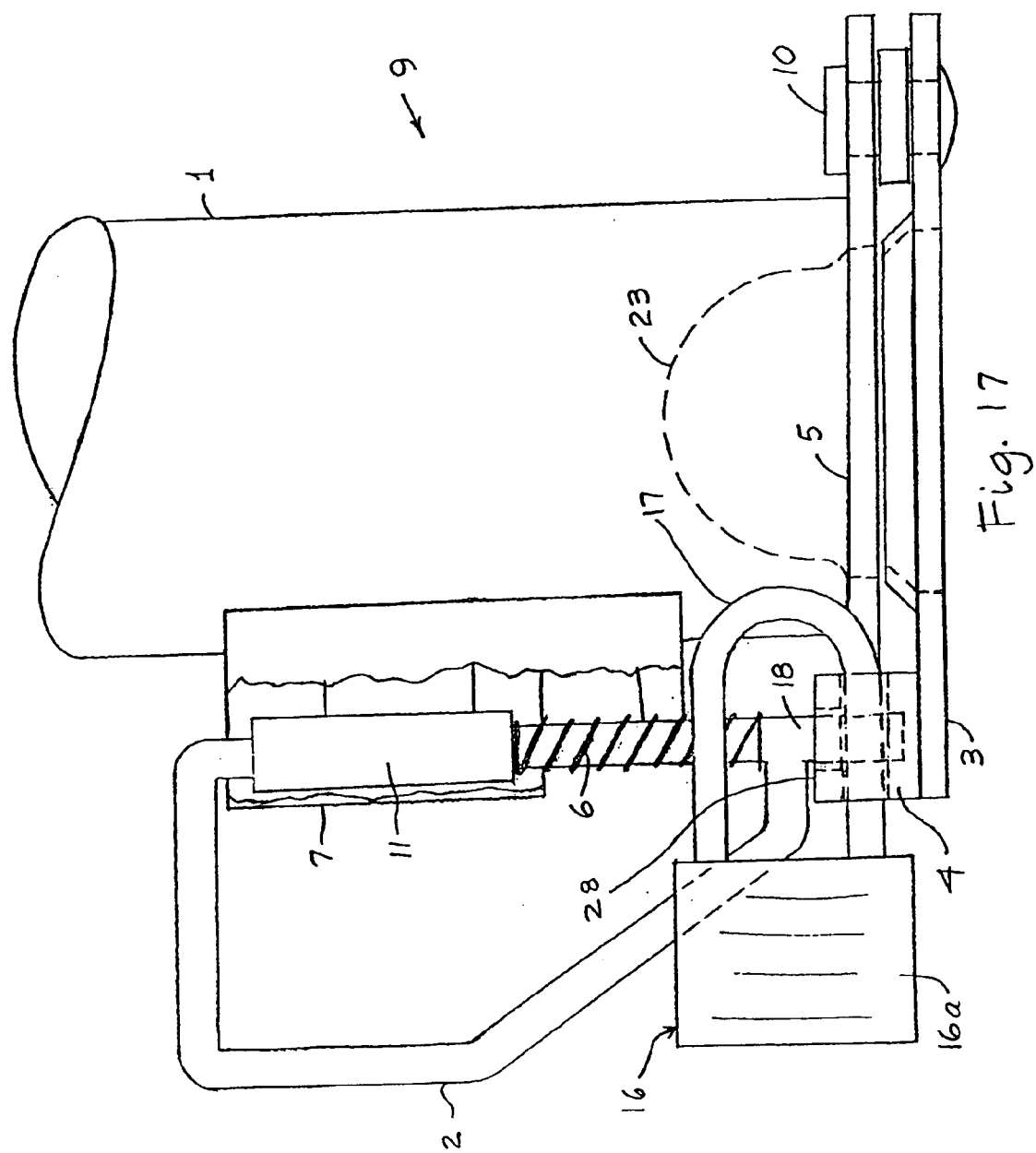
FIG. 17 is a side elevational view of a gooseneck coupler and lock in accordance with still another embodiment of the present invention.

FIG. 17 illustrates a fifth preferred embodiment wherein the hasp 17 of a lock 16 is inserted through opening 4a of retainer bracket 4 and lock 16 is locked without passing hasp 17 through handle 2. Lock plate 3 is in the closed position. The diameter of hasp 17 is sized such that lock plate 3 is not free to swing to the open position because hasp 17 becomes bound between stationary plate 5 and retainer bracket 4. Thus, even though latch pin 18 of handle 2 may be released from engagement with retainer bracket 4, coupler 9 may not be opened due to the binding of hasp 17, plate 5, and retainer bracket 4. In FIG. 17, hasp 17 of lock 16 is inserted through opening 4a of retainer bracket 4 from the side adjacent sheathing member 1 such that the body 16a of lock 16 is disposed away from sheathing member 1.

Alternatively, as shown in FIG. 18, the hasp 38 of a lock 36 may be inserted through opening 4a of retainer bracket 4 from the side away from sheathing member 1 such that the body 36a of lock 36 is disposed adjacent sheathing member 1. Hasp 38 may pass through handle 2 as well as retainer bracket 4 as shown in FIG. 18, or hasp 38 may pass through only retainer bracket 4 in a manner similar to FIG. 17. Hasp 38 may be provided with a bend 40 if an increased width is required in order to capture handle 2. Hasp 38 preferably passes through both handle 2 and retainer bracket 4 as shown in FIG. 18 so that lock 36 will remain upright rather than flip down to rest on the bed of the vehicle to which the hitch ball is attached. Additionally, by passing hasp 38 through both handle 2 and retainer bracket 4, lock 36 provides redundancy in the locking of coupler 9 because handle 2 is prevented from moving upward and releasing latch pin 18 from engagement with retainer bracket 4, and hasp 38 also prevents lock plate 3 from moving to the open position due to the binding of hasp 38 between stationary plate 5 and retainer bracket 4. For versatility, a lock 16 (FIG. 14) having dimensions $D_h$ of about 7/16 in., width $W_h$ of about 1¼ in., and length $L_h$ of about 4½ in. may be installed in the manner shown in FIG. 18 with any one of standard handles 20, 21, or 29 illustrated in FIG. 5.

It should be understood from the present disclosure that couplers may be originally produced or retrofitted with the features described herein to provide a gooseneck coupler system that enables the user to close the hitch ball receiving cavity sufficiently not to receive a hitch ball, thus preventing theft of the trailer to which the coupler is mounted. Further, after a hitch ball is inserted into the receiving cavity, the lock plate is moved to the closed position, and the present invention is installed, the hitch ball will remain secure in the coupler until unlocked by an authorized person. The present invention thus prevents unauthorized hitching or unhitching of a gooseneck trailer.

Although the invention has been described with reference to several specific embodiments, this description is not meant to be construed in a limiting sense. On the contrary, various modifications of the disclosed embodiments will become apparent to those skilled in the art upon reference to this description. For example, although the figures illustrate handle 2 in a position to the right of handle guide 11, this invention may be arranged with handle 2 in a position to the left of handle guide 11. Also, the relative positions of the coupler handle and the lock pin may be reversed from the positions illustrated in the figures. For example, FIGS. 8 and 9 show eyelet 33 of lock pin 14 located between sheathing member 1 and handle 2, but handle 2 could be located between sheathing member 1 and eyelet 33. Similarly, FIG. 11 shows bent lock pin 13 in front of handle 2, but bent lock pin 13 may be inserted behind handle 2. Likewise, FIGS. 15 and 16 depict eyelet 33 of lock pin 14 in front of handle 2, but eyelet 33 of lock pin 14 may be placed behind handle 2. Such modifications, alternatives, and equivalents are considered to be within the true spirit and scope of this invention.

We claim:

1. A combined locking apparatus and gooseneck trailer hitch, said combination comprising:
   the gooseneck trailer hitch comprising:
      a tubular member;
      a handle slidably mounted to said tubular member, said handle having a latch pin;
      a receiving plate fixed to said tubular member, said receiving plate defining a cavity for receiving a hitch ball and having a flange defining a first aperture for receiving said latch pin;
      a lock plate pivotally connected to said receiving plate, said lock plate defining a second aperture for receiving said hitch ball; and
      a retainer bracket fixed to said lock plate, said retainer bracket defining a slot in which said flange of said receiving plate is slidably disposed, said retainer bracket further defining a third aperture for receiving said latch pin;
      wherein said latch pin is inserted into said third aperture of said retainer bracket and said first aperture of said receiving plate to immobilize said lock plate in a closed position in which said second aperture of said lock plate is misaligned with said cavity, thereby preventing insertion or removal of said hitch ball from said cavity;
   a bar disposed in said slot of said retainer bracket adjacent said flange of said receiving plate; and
   a lock body locking said bar in said slot of said retainer bracket;
   thereby substantially immobilizing said lock plate within said slot.

2. The combination of claim 1 wherein said bar traps said handle upon insertion of said bar into said slot of said retainer bracket.

3. The combination of claim 1 wherein said lock body is key operated and fixable on a first end of said bar.

4. The combination of claim 1 wherein said lock body is combination code operated and fixable on a first end of said bar.

5. The combination of claim 2 wherein said lock body is key operated and fixable on first and second ends of said bar, wherein said bar is "U" shaped and traps said handle prior to fixing said lock body on said bar.

6. The combination of claim 2 wherein said lock body is combination code operated and fixable on first and second ends of said bar, wherein said bar is "U" shaped and traps said handle prior to fixing said lock body on said bar.

* * * * *